US012130196B2

(12) United States Patent
Paskell

(10) Patent No.: US 12,130,196 B2
(45) Date of Patent: Oct. 29, 2024

(54) METHODS AND SYSTEMS FOR VERIFYING THE ALIGNMENT OF VEHICLE DEVICES

(71) Applicant: Ford Global Technologies, LLC, Dearborn, MI (US)

(72) Inventor: Kerry Lance Paskell, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/711,337

(22) Filed: Apr. 1, 2022

(65) Prior Publication Data

US 2023/0314275 A1    Oct. 5, 2023

(51) Int. Cl.
*G01M 11/06* (2006.01)
(52) U.S. Cl.
CPC .................. *G01M 11/064* (2013.01)
(58) Field of Classification Search
CPC .......... G01M 11/064; G01M 11/067
See application file for complete search history.

(56) References Cited

U.S. PATENT DOCUMENTS

| 9,517,895 | B2* | 12/2016 | Bacalia ................. B25J 9/1682 |
| 9,863,843 | B2 | 1/2018 | Ekladyous et al. |
| 11,597,091 | B2* | 3/2023 | Lawrence ............. G01S 7/4972 |
| 2011/0077900 | A1* | 3/2011 | Corghi ............... G01B 11/2755 |
| | | | 702/150 |
| 2017/0113344 | A1* | 4/2017 | Schönberg ............. B25J 9/1687 |
| 2018/0339456 | A1* | 11/2018 | Czinger ................ B29C 64/379 |
| 2019/0283824 | A1* | 9/2019 | Rawas ................. B62D 27/026 |
| 2020/0103308 | A1* | 4/2020 | Corghi ................. G01M 11/067 |
| 2020/0158598 | A1* | 5/2020 | Corghi ................. G01M 11/064 |
| 2020/0164737 | A1* | 5/2020 | Kozlenok ............ B62D 63/025 |
| 2021/0387637 | A1* | 12/2021 | Rogers ................ B60W 60/001 |
| 2022/0089237 | A1* | 3/2022 | Sverdlov ................ B25J 9/1697 |

FOREIGN PATENT DOCUMENTS

EP    1953520    8/2008

OTHER PUBLICATIONS

Kuka AG, Human-Robot Collaboration During Headlight Adjustment, Jan. 2019, pp. 1-5, KUKA Systems HRC, Germany.

* cited by examiner

*Primary Examiner* — Edmond C Lau
*Assistant Examiner* — Joshua M Carlson
(74) *Attorney, Agent, or Firm* — Burris Law, PLLC

(57) ABSTRACT

A method for verifying an alignment of one or more devices of a vehicle in a manufacturing environment includes selecting an alignment verification routine to be performed by an autonomous alignment verification mobile robot (AAVMR) and autonomously positioning the AAVMR based on a position of the vehicle and one or more displacements associated with the alignment verification routine. The method includes performing, using the AAVMR, the alignment verification routine to generate one or more alignment characteristics associated with the one or more devices and broadcasting a notification based on the one or more alignment characteristics.

20 Claims, 7 Drawing Sheets

METHODS AND SYSTEMS FOR VERIFYING THE ALIGNMENT OF VEHICLE DEVICES

FIELD

The present disclosure relates to systems and methods for verifying the alignment of vehicle devices.

BACKGROUND

The statements in this section merely provide background information related to the present disclosure and may not constitute prior art.

During a manufacturing process, a vehicle may be subjected to various alignment verification routines to verify that one or more external devices or systems of the vehicle are properly aligned. As an example, the alignment verification routines may verify the alignment of headlights, taillights, sensor assemblies configured to detect an environment surrounding the vehicle, and other devices. However, many alignment verification routines are performed at an end-of-line (EOL) testing region of a manufacturing environment and after the manufacturing process of the vehicle is completed. Additionally, many alignment verification routines that are performed during the manufacturing process are manually performed by an operator. The present disclosure addresses these and other issues related to alignment verification routines.

SUMMARY

This section provides a general summary of the disclosure and is not a comprehensive disclosure of its full scope or all of its features.

The present disclosure provides a method for verifying an alignment of one or more devices of a vehicle in a manufacturing environment. The method includes selecting an alignment verification routine to be performed by an autonomous alignment verification mobile robot (AAVMR) and autonomously positioning the AAVMR based on a position of the vehicle and one or more displacements associated with the alignment verification routine. The method includes performing, using the AAVMR, the alignment verification routine to generate one or more alignment characteristics associated with the one or more devices and broadcasting a notification based on the one or more alignment characteristics.

In one form, the one or more displacements comprise a first displacement associated with a first step of the alignment verification routine and a second displacement associated with a second step of the alignment verification routine. In one form, autonomously positioning the AAVMR based on the position of the vehicle and the one or more displacements further comprises autonomously positioning the AAVMR at a first position based on the position of the vehicle and the first displacement and in response to performing the first step of the alignment verification routine, autonomously positioning the AAVMR at a second position based on the position of the vehicle and the second displacement. In one form, performing, using the AAVMR, the alignment verification routine to generate one or more alignment characteristics associated with the one or more devices further comprises performing, using the AAVMR and in response to autonomously positioning the AAVMR at the first position, the first step of the alignment verification routine to generate first alignment characteristics from among the one or more alignment characteristics, and performing, using the AAVMR and in response to autonomously positioning the AAVMR at the second position, the second step of the alignment verification routine to generate second alignment characteristics from among the one or more alignment characteristics. In one form, the notification includes a misalignment instruction indicating that the one or more devices are misaligned. In one form, the notification includes an alignment instruction configured to instruct the vehicle to adjust an orientation of the one or more devices based on a subsequent step of the alignment verification routine.

In one form, the alignment verification routine is a headlight alignment verification routine, the one or more devices include one or more headlights of the vehicle, and the alignment instruction is configured to instruct the vehicle to adjust the orientation of the one or more headlights based on a predefined orientation of the one or more headlights associated with the subsequent step of the alignment verification routine. In one form, the alignment verification routine is one of a taillight alignment verification routine, a headlight alignment verification routine, and a sensor alignment verification routine. In one form, the method further comprises autonomously positioning the AAVMR based on one or more AAVMR orientations associated with the alignment verification routine. In one form, the one or more displacements associated with the alignment verification routine are based on one or more vehicle dimensions of the vehicle and a field of view of an image sensor disposed on the AAVMR. In one form, the one or more vehicle dimensions comprise a vehicle height, a ride height, a tire diameter, or a combination thereof. In one form, the one or more displacements associated with the alignment verification routine are based on one or more non-traversable areas of the manufacturing environment. In one form, the one or more displacements associated with the alignment verification routine are based on a height of an autonomous production transportation mobile robot (APTMR) configured to transport the vehicle and a field of view of an image sensor disposed on the AAVMR. In one form, the alignment verification routine is selected based on a voice query.

The present disclosure provides a system for verifying an alignment of one or more devices of a vehicle in a manufacturing environment. The system includes one or more processors and one or more nontransitory computer-readable mediums storing instructions that are executable by the one or more processors. The instructions include selecting an alignment verification routine to be performed by an autonomous alignment verification mobile robot (AAVMR), where the AAVMR comprises an image sensor and autonomously positioning the AAVMR based on a position of the vehicle and one or more displacements associated with the alignment verification routine, where the one or more displacements associated with the alignment verification routine are based on a field of view of the image sensor and at least one of a height of an autonomous production transportation mobile robot (APTMR) configured to transport the vehicle and one or more vehicle dimensions of the vehicle. The instructions include performing, using the AAVMR, the alignment verification routine to generate one or more alignment characteristics associated with the one or more devices and broadcasting a notification based on the one or more alignment characteristics.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
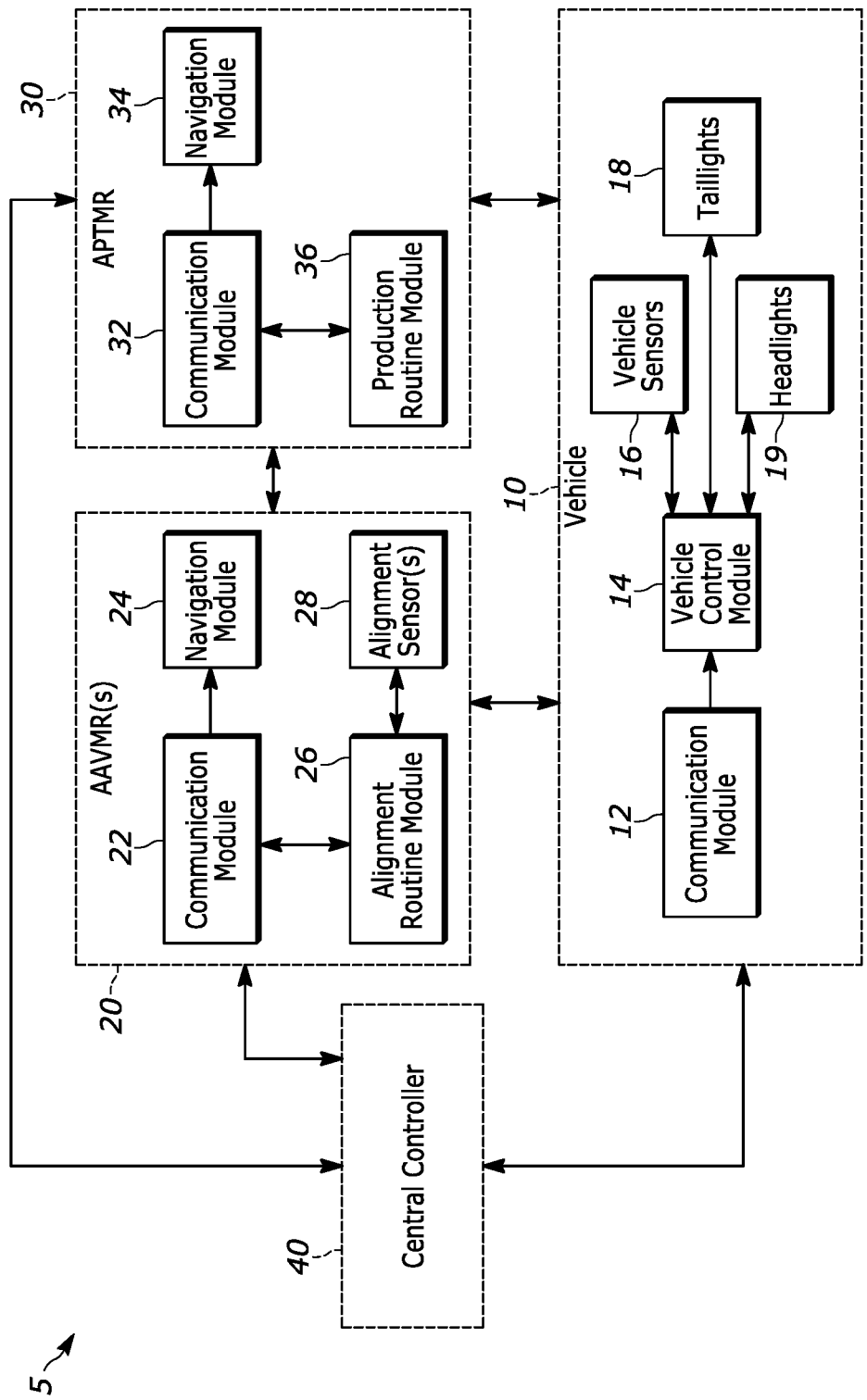
FIG. 1A is a functional block diagram of a manufacturing environment having a vehicle, one or more autonomous alignment verification mobile robots, one or more autonomous production transportation mobile robots, and a central controller in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for verifying the alignment of various vehicle components as a vehicle is subjected to a manufacturing routine and/or as the vehicle traverses a manufacturing environment. In one form, the manufacturing environment includes one or more autonomous alignment verification mobile robots that perform the alignment verification routines while dynamically and autonomously adapting their position and/or orientation as the vehicle traverses the environment. Accordingly, the autonomous alignment verification mobile robots can dynamically identify misalignments associated with various components of the vehicle as the vehicle traverses the environment.

Furthermore, the autonomous alignment verification mobile robots may be communicably coupled to the vehicle and instruct the vehicle to adjust the positions and/or orientations of devices that are subjected to the alignment verification routine. As such, the autonomous alignment verification mobile robots can perform the alignment verification routine for multiple positions/orientations of devices during a manufacturing process and without operator manipulation of the position/orientation of the respective devices.

Figure 1B:
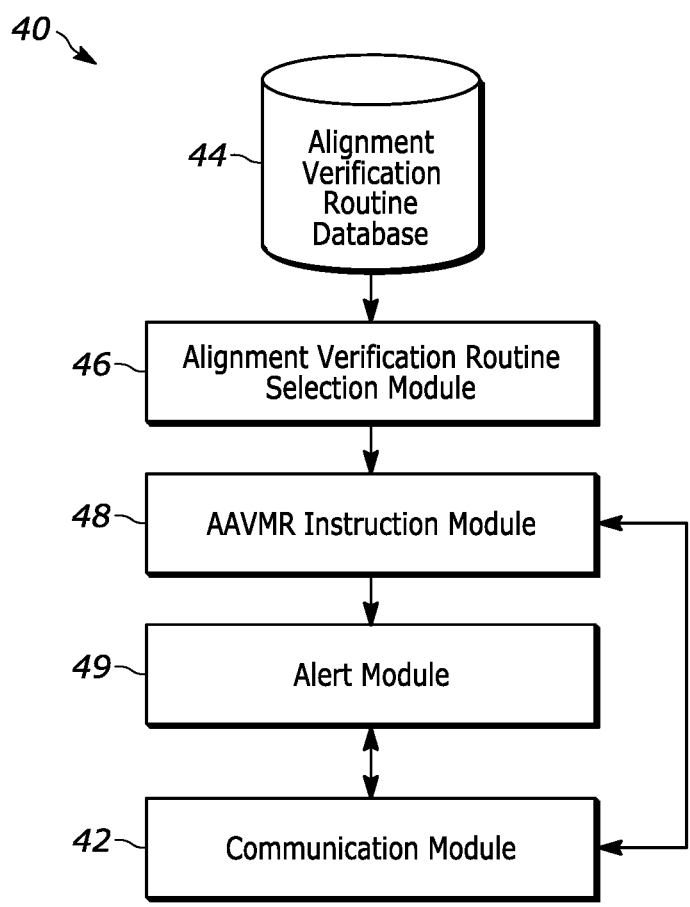
FIG. 1B is a functional block diagram of a central controller in accordance with the teachings of the present disclosure.

Referring to FIGS. 1A-1B, a manufacturing environment 5 is provided and generally includes a vehicle 10, one or more autonomous alignment verification mobile robots (AAVMRs) 20, one or more autonomous production transportation mobile robots (APTMRs) 30, and a central controller 40. It should be readily understood that any one of the components of the vehicle 10, the one or more AAVMRs 20, the one or more APTMRs 30, and the central controller 40 can be provided at the same location or distributed at different locations (e.g., via one or more edge computing devices) and communicably coupled accordingly.

In one form, the vehicle 10, the one or more AAVMRs 20, the one or more APTMRs 30, and the central controller 40 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). Specifically, the vehicle 10, the one or more AAVMRs 20, the one or more APTMRs 30, and the central controller 40 include communication modules 12, 22, 32, 42, respectively, where each communication module 12, 22, 32, 42 includes one or more transceivers, radio circuits, amplifiers, modulation circuits, processor circuits, memory circuits, among others, to communicate via a given wireless communication protocol.

In one form, the vehicle 10 includes a vehicle control module 14, vehicle sensors 16, taillights 18, and headlights 19. In one form, the components of the vehicle 10 are communicably coupled using a vehicle communication network, such as a controlled area network (CAN), a local interconnect network (LIN), and/or other suitable communication networks.

In one form, the vehicle sensors 16 are external sensors configured to generate sensor data associated with an area surrounding the vehicle 10. As an example, the vehicle sensors 16 are image sensors configured to selectively obtain image data surrounding the vehicle 10. The image sensors may be disposed at any location of the vehicle 10, such as a rear, side, and/or front of the vehicle 10. Example image sensors include, but are not limited to a two-dimensional (2D) camera, a three-dimensional (3D) camera, an infrared sensor, a radar scanner, a laser scanner, among other imaging devices.

In one form, the taillights 18 include lighting assemblies configured to alert operators of trailing vehicles when the brakes of the vehicle 10 are applied during a braking event. In one form, the headlights 19 include lighting assemblies configured to illuminate an area in front of the vehicle 10. The lighting assemblies of the taillights 18 and the headlights 19 may include various known components for performing the functionality described herein, including housings, light-emitting diode (LED) systems, servo motors, among other components.

In one form, the vehicle control module 14 is configured to control various functions of the vehicle 10 based on sensor data generated by the vehicle sensors 16 and/or one or more navigation sensors of the vehicle 10 (not shown), such as a global navigation satellite system (GNSS) sensor, a local position sensor, among other navigation sensors. As an example, the vehicle control module 14 is configured to perform various known advanced driver assistance system (ADAS) routines (e.g., a collision avoidance routine) and/or known autonomous navigation routines based on sensor data generated by the navigation sensors and/or the vehicle sensors 16.

In one form, the vehicle control module 14 is configured to determine a position of the vehicle 10 based on the sensor data generated by the navigation sensors and/or the vehicle sensors 16 and broadcast the position to the AAVMR 20 and/or the central controller 40 via the communication module 12. As described below in further detail, the central controller 40 is configured to instruct the AAVMR 20 to autonomously position itself based on the position of the vehicle 10.

In one form, the vehicle control module 14 is configured to iteratively position and/or adjust the orientation using the servo motors of the taillights 18 and/or the headlights 19. As described below in further detail, the central controller 40 is configured to instruct the AAVMR 20 to perform an alignment verification routine based on the position and/or orientation of the taillights 18 and/or the headlights 19. Once adjusted, the vehicle control module 14 is configured to broadcast an adjusted position/orientation to the AAVMR 20 and/or the central controller 40 via the communication module 12.

In one form, the AAVMR 20 includes a navigation module 24, an alignment verification routine module 26, and one or more alignment sensors 28. In one form, the AAVMR 20 is a mobile robot that is partially or fully autonomous and is configured to autonomously move to various locations of the manufacturing environment 5 based on an alignment verification routine selected by the central controller 40, as described below in further detail. To autonomously move itself, the navigation module 24 is configured to control various movement systems of the AAVMR 20 (e.g., propulsion systems, steering systems, and/or brake systems) based on one or more autonomous navigation sensors of the AAVMR 20 (e.g., a GNSS sensor, an imaging sensor, a local position sensor, among others).

In one form, the alignment verification routine module 26 is configured to perform an alignment verification routine based on an instruction received from the central controller 40, as described below in further detail. In one form, the alignment verification routine may include a taillight alignment verification routine associated with the taillights 18, a headlight alignment verification routine associated with the headlights 19, and/or a sensor alignment verification routine associated with the vehicle sensors 16. To perform the alignment verification routine, the alignment verification routine module 26 is configured to control the operation of the one or more alignment sensors 28 (e.g., a 2D camera, a 3D camera, an infrared sensor, a radar scanner, a laser scanner, among other imaging devices).

As an example, the alignment verification routine module 26 is configured to position a plurality of laser scanners (as the one or more alignment sensors 28) based on an alignment verification routine selected by the central controller 40, which may identify a vehicle type of the vehicle 10 and/or a selected device of the vehicle 10 (e.g., the vehicle sensors 16, the taillights 18, the headlights 19, among others). When the laser scanners are properly positioned, the alignment verification routine module 26 activates the plurality of laser scanners to emit a laser beam toward the selected device of the vehicle 10 (e.g., the vehicle sensors 16, the taillights 18, or the headlights 19) and measure the resulting reflected laser beams. The alignment verification routine module 26 may determine one or more alignment characteristics based on the reflected laser beams and broadcast the one or more alignment characteristics to the central controller 40 and/or the vehicle 10. As an example, the one or more alignment characteristics may indicate a presence, type, and/or measurement of alignment/misalignment (e.g., the alignment characteristics indicate whether the reflected laser beams correspond to an offset misalignment with respect to a nominal offset value, an angular misalignment with respect to a nominal angular alignment value, or a combination thereof).

It should be understood that the alignment verification routine module 26 may perform other alignment verification routines of the vehicle 10 and is not limited to the example described herein. As an example, the alignment verification routine module 26 may perform image processing routines based on image data obtained from a 2D camera (as the one or more alignment sensors 28), such as a difference-based image processing routine, a semantic-based image processing routine, among other known image processing routines.

In one form, the alignment verification routine module 26 is configured to determine and broadcast a step from among a sequence of one or more steps of the alignment verification routine currently being performed. As described below in further detail, the central controller 40 is configured to instruct the AAVMR 20 to autonomously position itself based on one or more steps of the alignment verification routine.

In one form, the APTMR 30 includes a navigation module 34 and a production routine module 36. In one form, the APTMR 30 is a mobile robot that is partially or fully autonomous and is configured to autonomously transport the vehicle 10 to various locations of the manufacturing environment 5 based on a manufacturing process associated with the vehicle 10. Accordingly, the APTMR 30 may include a fixture, docking system, among other components configured to receive and secure the vehicle 10 to the APTMR 30.

To autonomously transport the vehicle 10, the navigation module 34 is configured to control various movement systems of the APTMR 30 (e.g., propulsion systems, steering systems, and/or brake systems) based on one or more autonomous navigation sensors of the APTMR 30 (e.g., a GNSS sensor, an imaging sensor, a local position sensor, among others) and a manufacturing process defined by the production routine module 36 (e.g., a manufacturing transformation routine, an installation routine, among others). Furthermore, the navigation module 34 may be configured to broadcast the position of the APTMR 30 to the central controller and/or the AAVMR 20 via the communication module 32.

In one form, the central controller 40 includes an alignment verification routine database 44, an alignment verification routine selection module 46, an AAVMR instruction module 48, and an alert module 49. In one form, the alignment verification routine database 44 includes a plurality of alignment verification routine entries, where each alignment verification routine entry defines an alignment verification routine, one or more vehicle parameters of the vehicle 10, and a device of the vehicle 10 that is subjected to the alignment verification routine. In one form, the one or more vehicle parameters include a vehicle type (e.g., a make, model, trim, among other distinguishing features of the vehicle 10), a vehicle height of the vehicle 10, a ride height of the vehicle 10, and/or a tire diameter of a tire of the vehicle 10. As used herein, "vehicle height" refers to the dimension measured vertically from the highest point on the vehicle body to the ground. As used herein, "ride height" refers to a dimension measured vertically from the base of a vehicle tire to the ground. Example alignment verification routine entries stored in the alignment verification routine database 44 are shown in Table 1.

TABLE #1

Alignment Verification Routine Entries

| Alignment Verification Routine Entry ID | Device Alignment for Verification | Vehicle Parameters | | |
|---|---|---|---|---|
| | | Vehicle Type | Vehicle Height | Ride Height | Tire Diameter |
| 1 | Vehicle Sensors | Vehicle $10_1$ | $A_1$ | $B_1$ | $C_1$ |
| 2 | Taillights | Vehicle $10_1$ | $A_1$ | $B_1$ | $C_1$ |
| 3 | Headlights | Vehicle $10_1$ | $A_1$ | $B_1$ | $C_1$ |
| 4 | Vehicle Sensors | Vehicle $10_2$ | $A_2$ | $B_2$ | $C_2$ |
| 5 | Taillights | Vehicle $10_2$ | $A_2$ | $B_2$ | $C_2$ |
| 6 | Headlights | Vehicle $10_2$ | $A_2$ | $B_2$ | $C_2$ |

"Vehicle $10_1$" and "vehicle $10_2$" represent vehicles having different parameters and/or vehicle types. For example, Table 1 provides vehicle $10_1$ and vehicle $10_2$ as having different vehicle heights ($A_1$ and $A_2$), ride heights ($B_1$ and $B_2$), and tire diameters ($C_1$ and $C_2$). In another example, vehicle $10_1$ and vehicle $10_2$ are provided by vehicles having different makes and models. In yet another example, vehicle $10_1$ and vehicle $10_2$ are provided by vehicles having the same make but different customizable options or features (e.g., a given make/model of a truck having different tire sizes, ride heights, and vehicle heights).

In one form, each alignment verification routine entry also defines one or more steps of the alignment verification routine, one or more displacements, one or more AAVMR orientations, one or more AAVMR field of views (FOVs), or a combination thereof. In one form, the one or more steps identify a sequential value of a given step of the alignment verification routine and/or a description of the action to be performed at the given step.

In one form, the displacements indicate a nominal 2D or 3D displacement between a current position of the vehicle 10 (and/or the corresponding device, such as the vehicle sensors 16, the taillights 18, or the headlights 19) and the one or more alignment sensors 28 to perform the given step of the alignment verification routine. The nominal 2D or 3D displacement may be based on the operation characteristics of the one or more alignment sensors 28, such as a distance between the one or more alignment sensors 28 and a given device to satisfy a given accuracy constraint. In one form, the nominal 2D or 3D displacement is based on non-traversable regions of the manufacturing environment 5 (e.g., the displacements are set to a value such that the AAVMR 20 and/or the vehicle 10 avoid non-traversable regions of the manufacturing environment 5). In one form, the nominal 2D or 3D displacement is based on physical characteristics of the APTMR 30, such as a height of the APTMR 30 (e.g., the displacements are offset to accommodate the height of the APTMR 30). In some forms, the displacements may be provided as a single value or a range of values corresponding to one or more predefined tolerances.

In one form, the AAVMR orientations indicate an angular displacement of the one or more alignment sensors 28 along a given axis and relative to position of the vehicle 10 (and/or the corresponding device, such as the vehicle sensors 16, the taillights 18, or the headlights 19) to perform the given step of the alignment verification routine. In one form, the AAVMR orientations are based on physical characteristics of the APTMR 30, such as a height of the APTMR 30 (e.g., the AAVMR orientations are set to accommodate the height of the APTMR 30). In some forms, the AAVMR orientations may be provided as a single value or a range of values corresponding to one or more predefined tolerances.

In one form, the AAVMR FOVs identify a type of the AAVMR 20 from among a plurality of AAVMRs 20 and a FOV of the one or more alignment sensors 28 associated with the type of AAVMR 20, thereby enabling each alignment verification routine entry to be uniquely defined for various types of AAVMR 20 of the manufacturing environment 5. Example steps of the alignment verification routine, displacements, AAVMR orientations, and AAVMR FOVs of the alignment verification routine entries are shown in Table 2.

TABLE #2

Alignment Verification Routine Entries

| Alignment Verification Routine Entry ID | Device Alignment for Verification | Vehicle Type | AAVMR ID and FOV | Step of Alignment Verification Routine | Displacement at Given Step | Orientation at Given Step |
|---|---|---|---|---|---|---|
| 7 | Vehicle Sensors | Vehicle $10_1$ | AAVMR $20_1$ $FOV_1$ | 1) verify horizontal and vertical alignment | $(X_1, Y_1, Z_1)$ | $(\theta_1, X)$ |
| 8 | Vehicle Sensors | Vehicle $10_1$ | AAVMR $20_2$ $FOV_2$ | 1) verify horizontal and vertical alignment | $(X_2, Y_2, Z_2)$ | $(\theta_2, X)$ |
| 9 | Taillights | Vehicle $10_1$ | AAVMR $20_1$ $FOV_1$ | 1) verify horizontal and vertical alignment | $(X_3, Y_3, Z_3)$ | $(\theta_3, X)$ |
| 10 | Taillights | Vehicle $10_1$ | AAVMR $20_2$ $FOV_2$ | 1) verify horizontal and vertical alignment | $(X_4, Y_4, Z_4)$ | $(\theta_4, X)$ |
| 11 | Headlight | Vehicle $10_1$ | AAVMR $20_1$ $FOV_1$ | 1) verify horizontal and vertical alignment at first | $(X_5, Y_5, Z_5)$ | $(\theta_5, X)$ |

TABLE #2-continued

Alignment Verification Routine Entries

| Alignment Verification Routine Entry ID | Device Alignment for Verification | Vehicle Type | AAVMR ID and FOV | Step of Alignment Verification Routine | Displacement at Given Step | Orientation at Given Step |
|---|---|---|---|---|---|---|
|  | Headlight | Vehicle $10_1$ | AAVMR $20_1$ FOV$_1$ | servo position 2) verify horizontal and vertical alignment at second servo position | $(X_6, Y_6, Z_6)$ | $(\theta_5, X)$ |
| 12 | Headlight | Vehicle $10_1$ | AAVMR $20_2$ FOV$_2$ | 1) verify horizontal and vertical alignment at first servo position | $(X_7, Y_7, Z_7)$ | $(\theta_6, X)$ |
|  | Headlight | Vehicle $10_1$ | AAVMR $20_2$ FOV$_2$ | 2) verify horizontal and vertical alignment at second servo position | $(X_7, Y_7, Z_7)$ | $(\theta_7, X)$ |

In Table 2, various alignment verification routine entries are provided for the vehicle sensors 16, the taillights 18, and the headlights 19 of vehicle 10$_1$, and each alignment verification routine entry is uniquely defined for one of the AAVMRs 20$_1$, 20$_2$. Additionally, each alignment verification routine describes the action to be performed by the given AAVMR 20$_1$, 20$_2$ at the given step, a nominal 3D displacement (i.e., the XYZ coordinate), and the AAVMR orientations at the given step relative to a given axis (i.e., the angular displacement is defined by θ, and the given axis is defined as the X-axis in the above examples).

In one form, the alignment verification routine selection module 46 is configured to select an alignment verification routine to be performed by the AAVMR 20 based on the alignment verification routine entries of the alignment verification routine database 44. In one form, the alignment verification routine selection module 46 includes a human-machine-interface (HMI) configured to receive selections from an operator corresponding to a vehicle type and a desired alignment routine (e.g., an alignment verification of the headlights 19 of the vehicle 10), such as a graphical user interface and/or an audio system. As an example, the alignment verification routine selection module 46 includes microphones, speakers, and/or natural language user interface modules for receiving voice queries corresponding to a selection of the vehicle type and the desired alignment verification routine and translating the voice queries into code that is executable by the AAVMR 20. As another example, the alignment verification routine selection module 46 may include a display component (e.g., a touchscreen display) that enables the operator to manipulate graphical elements to indicate a selection of the vehicle type and desired alignment verification routine. It should be understood that the selection of the alignment verification routine can be performed in various ways and is not limited to the examples described herein.

In one form, the AAVMR instruction module 48 is configured to control the AAVMR 20 to verify the alignment of the device of the vehicle 10 based on the selected alignment verification routine. As an example, the AAVMR instruction module 48 autonomously positions the AAVMR 20 such that it is separated from the vehicle 10 (or the selected device) based on the one or more displacements associated with the alignment verification routine. Specifically, the AAVMR instruction module 48 may calculate and transmit one or more positions to the navigation module 24 that are based on a difference between the displacement(s) and the position of the vehicle 10. To perform the functionality described herein, the AAVMR instruction module 48 is configured to instruct the AAVMR 20 to travel to the one or more calculated positions using known autonomous navigation routines, such as a path planning routine, a maneuver planning routine, and/or a trajectory planning routine. Alternatively, the AAVMR instruction module 48 remotely and autonomously controls the AAVMR 20 as they travel to their respective calculated positions using the known autonomous navigation routines.

Furthermore, the AAVMR instruction module 48 is configured to instruct the AAVMR 20 to perform a given step of the selected alignment verification routine when the AAVMR 20 is at one of the determined calculated positions, generate the one or more alignment characteristics of the device, and broadcast a notification based on the one or more alignment characteristics. As an example, the AAVMR 20 may broadcast a notification to the vehicle 10 and/or the central controller 40 indicating whether an offset misalignment and/or angular misalignment is present as the vehicle 10 traverses within the manufacturing environment 5. Accordingly, the AAVMR 20 and/or an operator can dynamically identify sensor, taillight, or headlight misalignments during a manufacturing process as opposed to once the manufacturing process is completed.

As another example, the AAVMR 20 broadcasts an alignment instruction (as the notification) to the central controller 40 and the vehicle 10 indicating that a given step of the selected alignment verification routine is completed (e.g., the headlights 19 are aligned at a first servo position). Furthermore, the alignment instruction may include instructions that cause the vehicle control module 14 of the vehicle 10 to adjust an orientation of the device based on a subsequent step of the alignment verification routine (e.g., adjust the orientation of the headlights 19 based on a second servo position). Accordingly, the AAVMR 20 can perform the alignment verification routine for multiple positions/orientations of the vehicle sensors 16, taillights 18, and/or headlights 19 during a manufacturing process and without operator manipulation of the position/orientation of the respective devices.

In one form, the alert module 49 is configured to generate and/or broadcast a visual, auditory, and/or haptic alert based on the notifications and the alignment characteristics broadcasted by the AAVMR 20. As an example, the alert module 49 is configured to generate a visual and haptic alert to a virtual reality (VR) device of the operator corresponding to a detected misalignment of the device (as indicated by the notification broadcasted by the AAVMR 20). To perform the functionality described herein, the alert module 49 may include one or more known HMI modules, audio modules, and/or haptic modules configured to generate the alerts.

Figure 2:
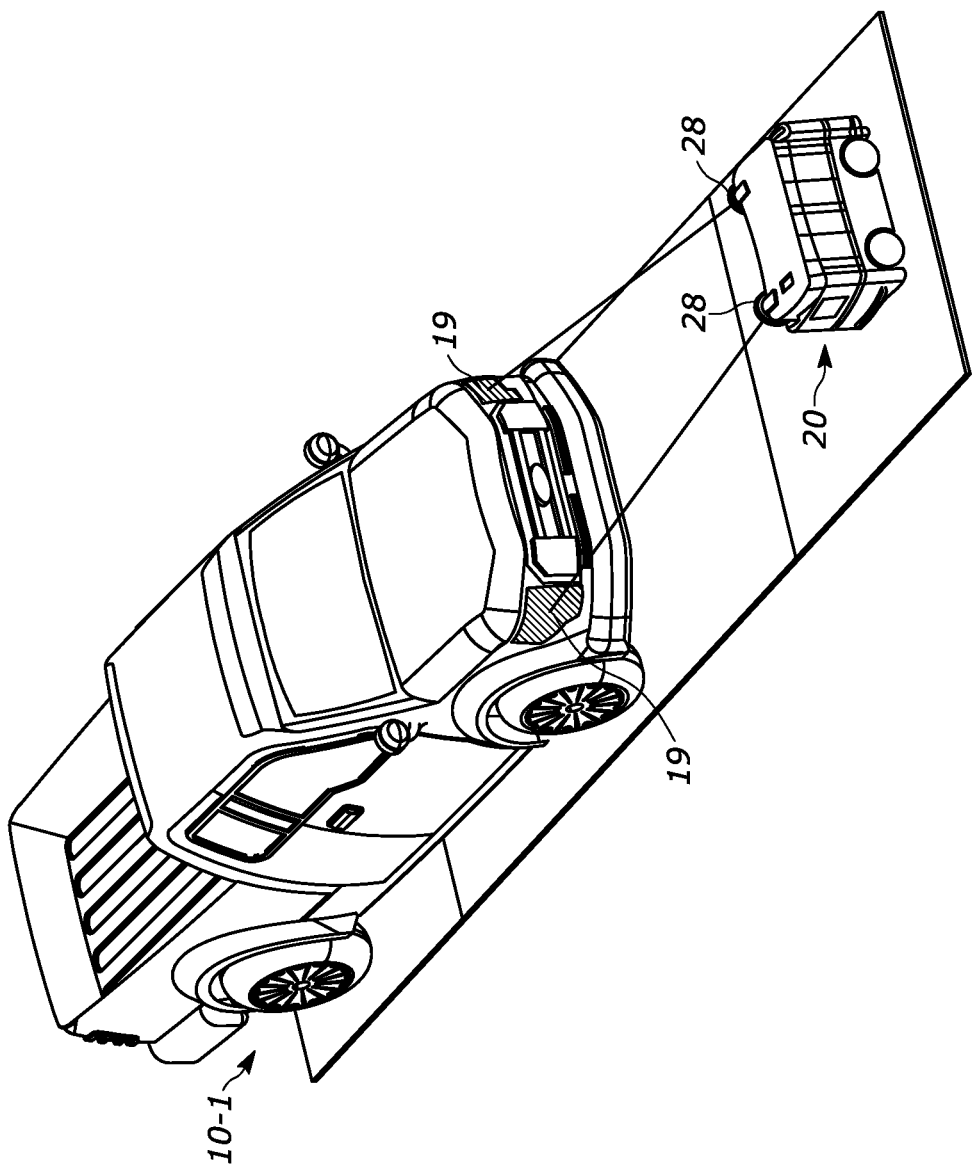
FIG. 2 illustrates an alignment verification routine performed by an autonomous alignment verification mobile robot in accordance with the teachings of the present disclosure.

In an example application and referring to FIG. 2, vehicle 10-1 (as the vehicle 10) autonomously traverses the manufacturing environment 5 as it is subjected to one or more manufacturing routines. The alignment verification routine selection module 46 selects a headlight alignment verification routine (as the alignment verification routine) to be performed by the AAVMR 20 based on a voice command received from the operator that corresponds to the identification of the vehicle 10-1 and/or the one or more vehicle parameters (i.e., the vehicle height, ride height, and tire diameter). The selected headlight alignment verification routine includes, for example, two alignment verification steps for two different orientations (i.e., servo positions) of the headlights 19, and each alignment verification step includes an associated displacement (i.e., a first displacement and a second displacement). Accordingly, the AAVMR instruction module 48 calculates a first position based on the position of the vehicle 10-1 and the first displacement, and the AAVMR instruction module 48 broadcasts a first step initiation instruction to the corresponding AAVMR 20. In one form, the first step initiation instruction causes the AAVMR 20 to autonomously travel to the first calculated position and perform the first step of the headlight alignment verification routine.

In response to the AAVMR 20 performing the first step of the headlight alignment verification routine, the AAVMR 20 generates first alignment characteristics and broadcasts a notification to the central controller 40 and the vehicle 10-1 based on the first alignment characteristics. As an example, the notification may indicate whether the headlights 19 are properly aligned and include an alignment instruction that causes the vehicle control module 14 to adjust the orientation of the headlights 19 to a predefined orientation associated with a subsequent step of the headlight alignment verification routine (i.e., the second servo position).

Furthermore, in response to the AAVMR 20 performing the first step of the headlight alignment verification routine, the AAVMR instruction module 48 calculates a second position based on the position of the vehicle 10-1 and the second displacement, and broadcasts a second step initiation instruction to the corresponding AAVMR 20. In one form, the second step initiation instruction causes the AAVMR 20 to autonomously travel to the second calculated position and perform the second step of the headlight alignment verification routine. In response to the AAVMR 20 performing the second step of the alignment verification routine, the AAVMR 20 generates second alignment characteristics and broadcasts a notification to the central controller 40 and the vehicle 10-1 based on the second alignment characteristics. Subsequently, the alert module 49 generates and transmits an alert corresponding to the notifications obtained from the AAVMR 20, which are based on the first and second alignment characteristics.

Figure 3:
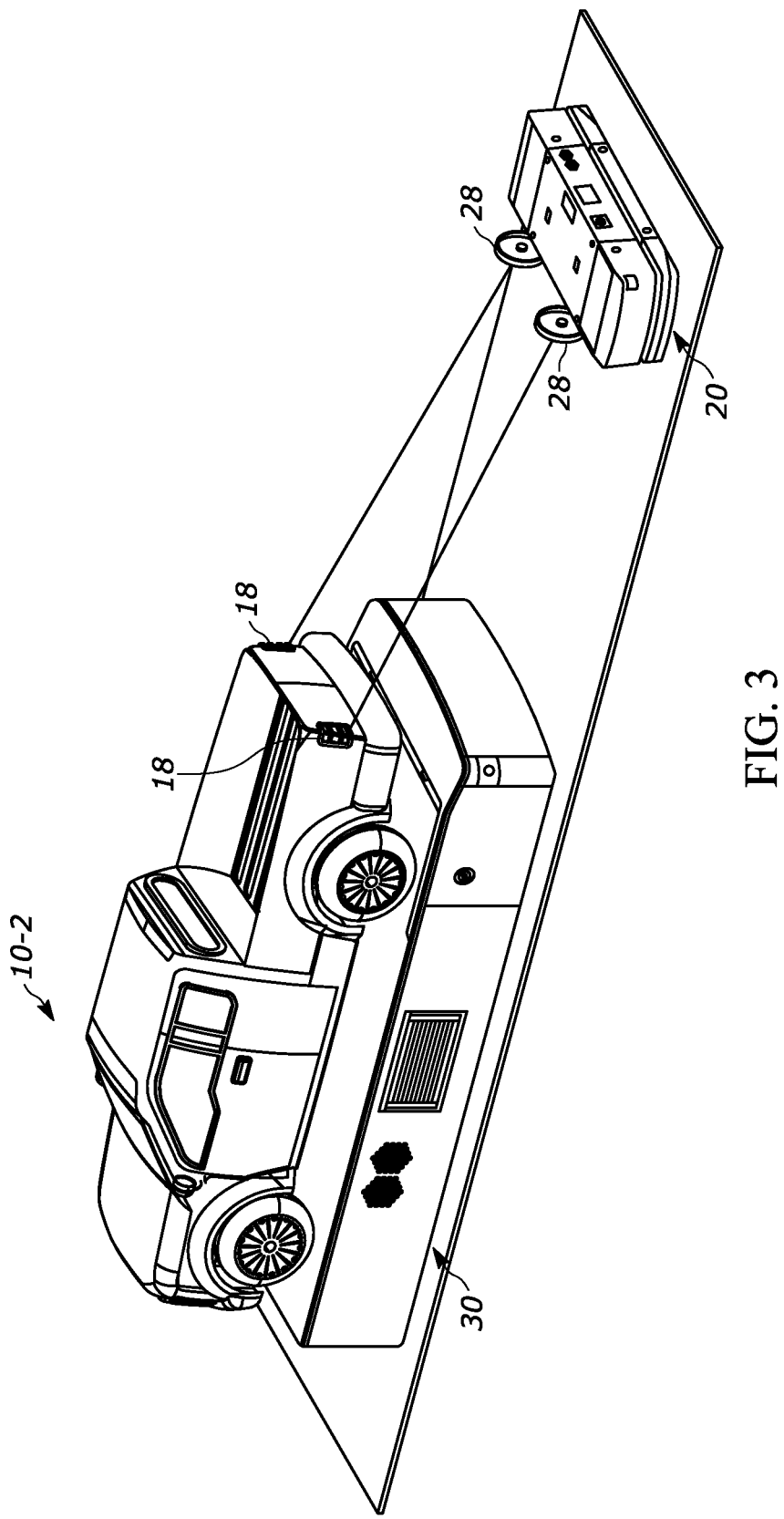
FIG. 3 illustrates an autonomous production transportation mobile robot transporting a vehicle and an autonomous alignment verification mobile robot performing an alignment verification routine in accordance with the teachings of the present disclosure.

In another example application and referring to FIG. 3, the APTMR 30 autonomously transports vehicle 10-2 (as the vehicle 10) within the manufacturing environment 5 as the vehicle 10-2 is subjected to one or more manufacturing routines. The alignment verification routine selection module 46 selects a taillight alignment verification routine (as the alignment verification routine) to be performed by the AAVMR 20 based on an input received from the operator via an HMI interface that corresponds to the identification of the vehicle 10-2, the one or more vehicle parameters (i.e., the vehicle height, ride height, and tire diameter), and a height of the APTMR. The selected taillight alignment verification includes, for example, one alignment verification step of the taillights 18 and an associated displacement (i.e., a first displacement). Accordingly, the AAVMR instruction module 48 calculates a first position based on the position of the vehicle 10-2, the first displacement, and the height of the APTMR 30. The AAVMR instruction module 48 broadcasts a first step initiation instruction to the corresponding AAVMR 20. In one form, the first step initiation instruction causes the AAVMR 20 to autonomously travel to the first calculated position and perform the first step of the taillight alignment verification routine.

Figure 4:
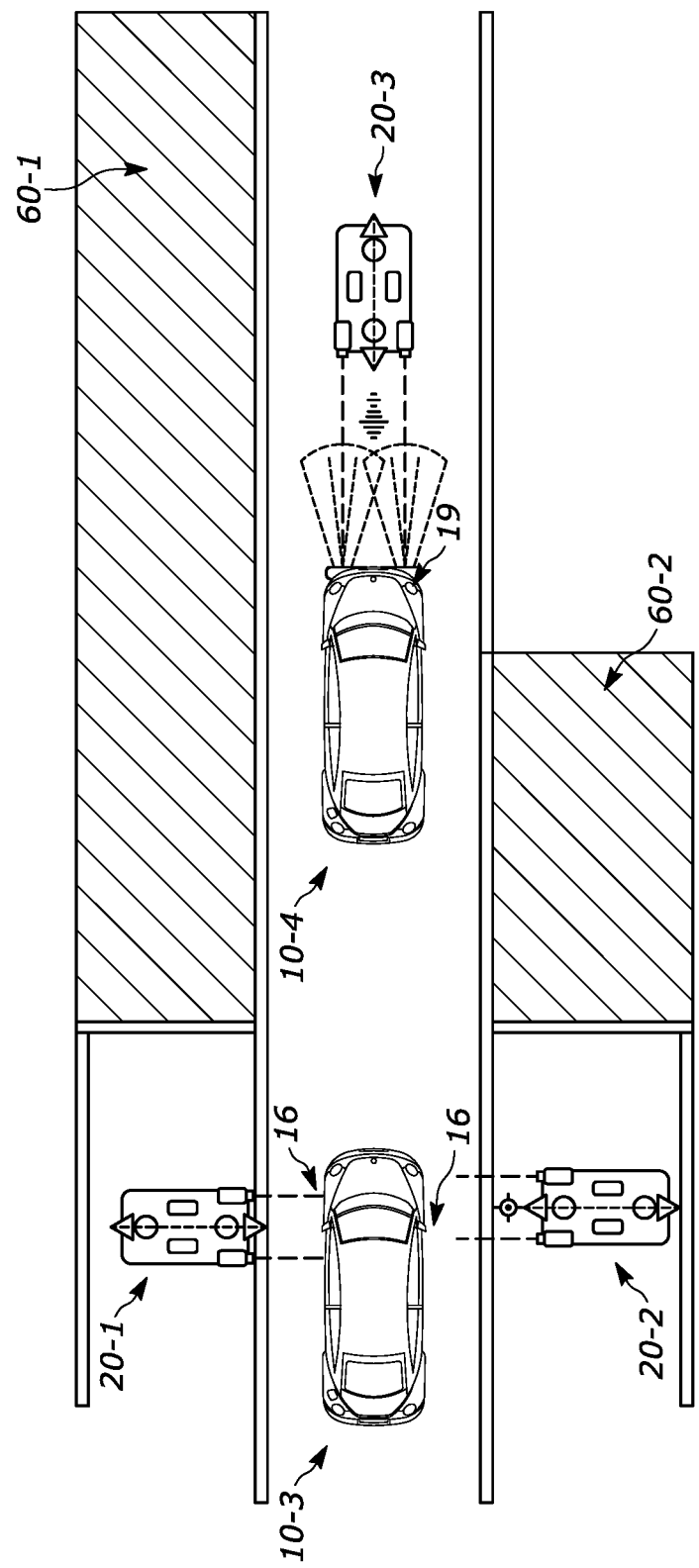
FIG. 4 illustrates a manufacturing environment having a vehicle, one or more autonomous alignment verification mobile robots, one or more autonomous production transportation mobile robots, and a central controller in accordance with the teachings of the present disclosure.

In an additional example application and referring to FIG. 4, vehicles 10-3, 10-4 (as the vehicle 10) autonomously traverse within the manufacturing environment 5 as it is subjected to one or more manufacturing routines. Furthermore, the alignment verification routine selection module 46 selects a sensor alignment verification routine to be performed by AAVMRs 20-1, 20-2 for the vehicle 10-3 and a headlight alignment verification routine to be performed by AAVMR 20-3 for the vehicle 10-4. However, in this example, the AAVMR instruction module 48 calculates the position of the AAVMRs 20-1, 20-2, 20-3 based on the position of the vehicles 10-3, 10-4, the one or more associated displacements, and one or more non-traversable regions 60 of the manufacturing environment 5. Specifically, the AAVMR instruction module 48 calculates the position of the AAVMRs 20-1, 20-2, 20-3 such that it avoids the one or more non-traversable regions 60-1, 60-2.

Figure 5:
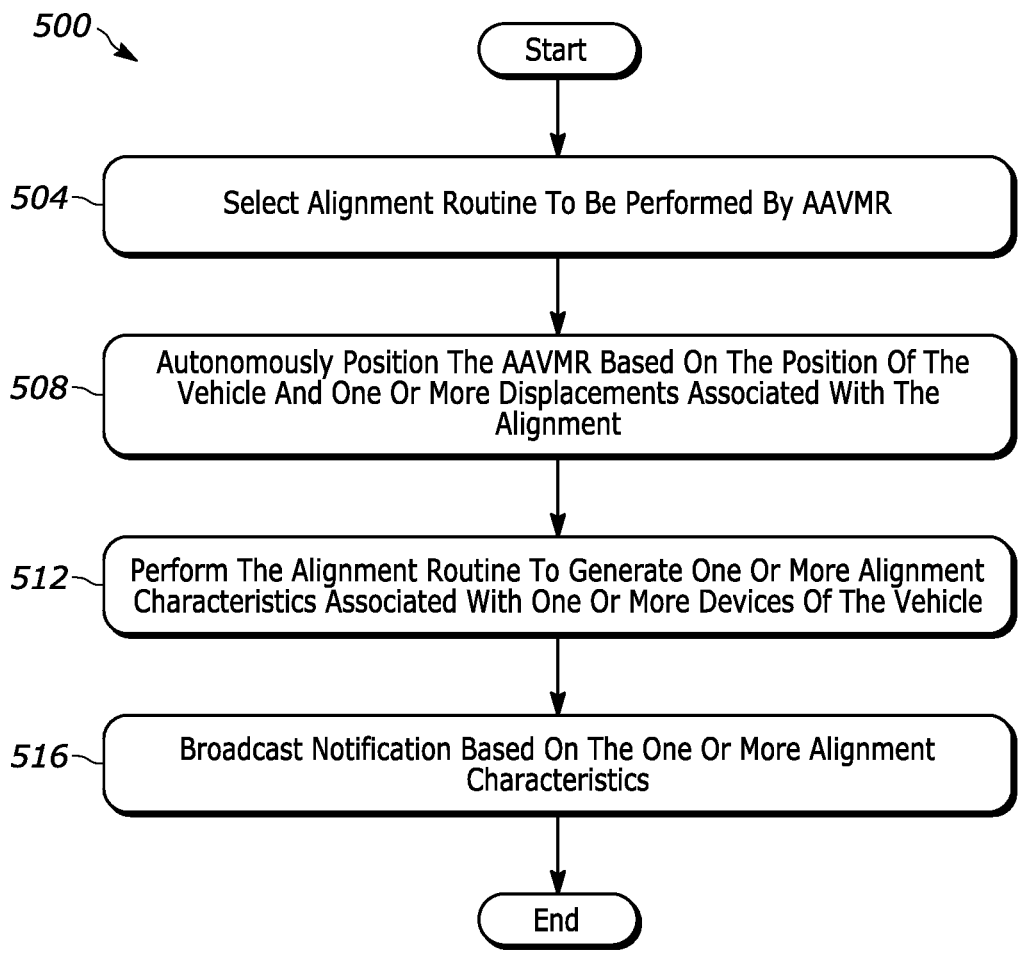
FIG. 5 is a flowchart of an example alignment verification routine in accordance with the teachings of the present disclosure.

Referring to FIG. 5, a flowchart illustrating a routine 500 for verifying an alignment of one or more devices of the vehicle 10 is shown. At 504, the central controller 40 selects an alignment verification routine to be performed by the AAVMR 20. At 508, the central controller 40 and/or the AAVMR 20 autonomously position the AAVMR based on a position of the vehicle and one or more displacements associated with the alignment verification routine. At 512, the AAVMR 20 performs the alignment verification routine to generate one or more alignment characteristics associated with the one or more devices. At 516, the AAVMR 20 broadcasts a notification based on the one or more alignment characteristics.

Figure 6:
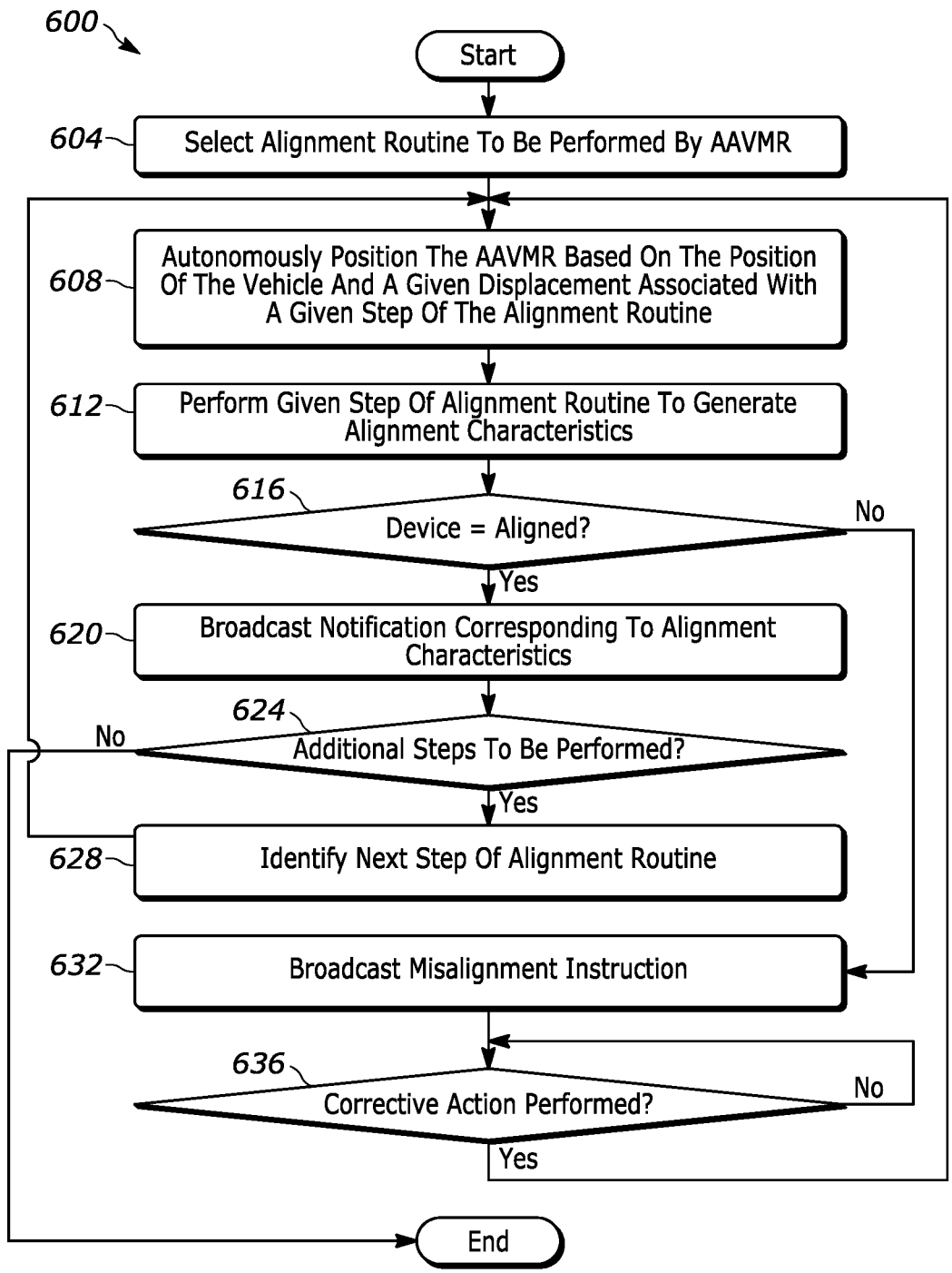
FIG. 6 is a flowchart of another example alignment verification routine in accordance with the teachings of the present disclosure.

Referring to FIG. 6, a flowchart illustrating a routine 600 for verifying an alignment of one or more devices of the vehicle 10 is shown. At 604, the central controller 40 selects an alignment verification routine to be performed by the AAVMR 20. At 608, the central controller 40 and/or the AAVMR 20 autonomously position the AAVMR based on a position of the vehicle and one or more displacements associated with the alignment verification routine. At 612, the AAVMR 20 performs the alignment verification routine to generate one or more alignment characteristics associated with the one or more devices.

At 616, the AAVMR 20 determines whether the alignment characteristics indicate the device is properly aligned. If so the routine 600 proceeds to 620. Otherwise, if the alignment characteristics indicate the device is misaligned, the routine 600 proceeds to 632, where the AAVMR 20 broadcasts the misalignment instruction to the central controller 40 and/or the vehicle 10 and then proceeds to 636. At 636, the vehicle control module 14 determines whether a corrective action has been performed (e.g., by an operator and/or by the vehicle 10), such as an adjustment of the position/orientation of the device based on the detected misalignment. If so, the routine 600 proceeds to 608. Otherwise, the routine 600 remains at 636.

At 620, the AAVMR 20 broadcasts a notification to the central controller 40 indicating the device is properly aligned. At 624, the AAVMR 20 determines whether the selected alignment verification routine includes additional steps. If so, the routine 600 proceeds to 628, where the AAVMR 20 and/or the central controller 40 identify the next step of the alignment routine and then proceeds to 608. If no additional steps remain at 624, the routine 600 ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for verifying an alignment of one or more devices of a vehicle in a manufacturing environment, the method comprising:
   selecting an alignment verification routine to be performed by an autonomous alignment verification mobile robot (AAVMR);
   autonomously positioning the AAVMR based on a position of the vehicle and one or more displacements associated with the alignment verification routine, wherein the one or more displacements associated with the alignment verification routine are based on a height of an autonomous production transportation mobile robot (APTMR) configured to transport the vehicle;
   performing, using the AAVMR, the alignment verification routine to generate one or more alignment characteristics associated with the one or more devices; and
   broadcasting a notification based on the one or more alignment characteristics.

2. The method of claim 1, wherein the one or more displacements comprise:
   a first displacement associated with a first step of the alignment verification routine; and
   a second displacement associated with a second step of the alignment verification routine.

3. The method of claim 2, wherein:
   autonomously positioning the AAVMR based on the position of the vehicle and the one or more displacements further comprises:
      autonomously positioning the AAVMR at a first position based on the position of the vehicle and the first displacement; and
      in response to performing the first step of the alignment verification routine, autonomously positioning the AAVMR at a second position based on the position of the vehicle and the second displacement; and
   performing, using the AAVMR, the alignment verification routine to generate one or more alignment characteristics associated with the one or more devices further comprises:
      performing, using the AAVMR and in response to autonomously positioning the AAVMR at the first position, the first step of the alignment verification routine to generate first alignment characteristics from among the one or more alignment characteristics; and
      performing, using the AAVMR and in response to autonomously positioning the AAVMR at the second position, the second step of the alignment verification routine to generate second alignment characteristics from among the one or more alignment characteristics.

4. The method of claim 1, wherein the notification includes a misalignment instruction indicating that the one or more devices are misaligned.

5. The method of claim 1, wherein the notification includes an alignment instruction configured to instruct the vehicle to adjust an orientation of the one or more devices based on a subsequent step of the alignment verification routine.

6. The method of claim 5, wherein:
the alignment verification routine is a headlight alignment verification routine;
the one or more devices include one or more headlights of the vehicle; and
the alignment instruction is configured to instruct the vehicle to adjust the orientation of the one or more headlights based on a predefined orientation of the one or more headlights associated with the subsequent step of the alignment verification routine.

7. The method of claim 1, wherein the alignment verification routine is one of a taillight alignment verification routine, a headlight alignment verification routine, and a sensor alignment verification routine.

8. The method of claim 1 further comprising autonomously positioning the AAVMR based on one or more AAVMR orientations associated with the alignment verification routine.

9. The method of claim 1, wherein the one or more displacements associated with the alignment verification routine are based on one or more vehicle dimensions of the vehicle and a field of view of an image sensor disposed on the AAVMR.

10. The method of claim 9, wherein the one or more vehicle dimensions comprise a vehicle height, a ride height, a tire diameter, or a combination thereof.

11. The method of claim 1, wherein the one or more displacements associated with the alignment verification routine are based on one or more non-traversable areas of the manufacturing environment.

12. The method of claim 1, wherein the one or more displacements associated with the alignment verification routine are further based on a field of view of an image sensor disposed on the AAVMR.

13. The method of claim 1, wherein the alignment verification routine is selected based on a voice query.

14. A system for verifying an alignment of one or more devices of a vehicle in a manufacturing environment, the system comprising:
one or more processors and one or more nontransitory computer-readable mediums storing instructions that are executable by the one or more processors, wherein the instructions comprise:
selecting an alignment verification routine to be performed by an autonomous alignment verification mobile robot (AAVMR), wherein the AAVMR comprises an image sensor;
autonomously positioning the AAVMR based on a position of the vehicle and one or more displacements associated with the alignment verification routine, wherein the one or more displacements associated with the alignment verification routine are based on height of an autonomous production transportation mobile robot (APTMR) configured to transport the vehicle;
performing, using the AAVMR, the alignment verification routine to generate one or more alignment characteristics associated with the one or more devices; and
broadcasting a notification based on the one or more alignment characteristics.

15. The system of claim 14, wherein the one or more displacements comprise:
a first displacement associated with a first step of the alignment verification routine; and
a second displacement associated with a second step of the alignment verification routine.

16. The system of claim 15, wherein:
the instructions for autonomously positioning the AAVMR based on the position of the vehicle and the one or more displacements further comprise:
autonomously positioning the AAVMR at a first position based on the position of the vehicle and the first displacement; and
in response to performing the first step of the alignment verification routine, autonomously positioning the AAVMR at a second position based on the position of the vehicle and the second displacement; and
the instructions for performing, using the AAVMR, the alignment verification routine to generate one or more alignment characteristics associated with the one or more devices further comprise:
performing, using the AAVMR and in response to autonomously positioning the AAVMR at the first position, the first step of the alignment verification routine to generate first alignment characteristics from among the one or more alignment characteristics; and
performing, using the AAVMR and in response to autonomously positioning the AAVMR at the second position, the second step of the alignment verification routine to generate second alignment characteristics from among the one or more alignment characteristics.

17. The system of claim 14, wherein the notification includes an alignment instruction configured to instruct the vehicle to adjust an orientation of the one or more devices based on a subsequent step of the alignment verification routine.

18. The system of claim 17, wherein:
the alignment verification routine is a headlight alignment verification routine;
the one or more devices include one or more headlights of the vehicle; and
the alignment instruction is configured to instruct the vehicle to adjust the orientation of the one or more headlights based on a predefined orientation of the one or more headlights associated with the subsequent step of the alignment verification routine.

19. The system of claim 14, wherein the instructions further comprising autonomously positioning the AAVMR based on one or more AAVMR orientations associated with the alignment verification routine.

20. The system of claim 14, wherein the one or more vehicle dimensions comprise a vehicle height, a ride height, a tire diameter, or a combination thereof.

* * * * *